(12) United States Patent
Ikonomov et al.

(10) Patent No.: US 9,561,628 B2
(45) Date of Patent: Feb. 7, 2017

(54) FLEXIBLE GUIDE FOR TIRE REPAIR

(75) Inventors: Metodi Lubenov Ikonomov, Moore, SC (US); Cesar Enrique Zarak, Simpsonville, SC (US); Nathan Joel Panning, Simpsonville, SC (US); Michael Edward Widmyer, Duncan, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 740 days.

(21) Appl. No.: 13/881,990

(22) PCT Filed: Oct. 29, 2010

(86) PCT No.: PCT/US2010/054789
§ 371 (c)(1),
(2), (4) Date: Apr. 26, 2013

(87) PCT Pub. No.: WO2012/057795
PCT Pub. Date: May 3, 2012

(65) Prior Publication Data
US 2013/0213556 A1    Aug. 22, 2013

(51) Int. Cl.
*B29C 73/26*    (2006.01)
*B26D 3/00*    (2006.01)
(Continued)

(52) U.S. Cl.
CPC .............. *B29C 73/26* (2013.01); *B24B 5/366* (2013.01); *B26D 3/003* (2013.01); *B26D 3/06* (2013.01);
(Continued)

(58) Field of Classification Search
CPC .............. B29D 2030/0072; B29C 73/10; B29C 73/105; B29C 73/12; B29C 73/14; B29C 73/26; B29C 2073/262; B29C 2073/264; B26D 3/005; B26D 3/003; B26D 3/06; B26B 29/06; B24B 23/005
(Continued)

(56) References Cited

U.S. PATENT DOCUMENTS 907,058 A    12/1908    Kraemer
1,395,309 A    11/1921    Taber et al.
(Continued)

FOREIGN PATENT DOCUMENTS

CN    1706629 A    12/2005
CN    101045285 A    10/2007
(Continued)

OTHER PUBLICATIONS

Continental Tire North America, "Tire Repair for Passenger Car and Light Truck Tires", Nov. 17, 2005, 2 pages.
(Continued)

*Primary Examiner* — Geoffrey L Knable
(74) *Attorney, Agent, or Firm* — Hahn Loeser & Parks LLP; Bret A. Hrivnak, Esq.

(57) ABSTRACT

A method for preparing a portion of a tire for repair includes the steps of providing a template having a pair of guide edges, securing the template to an interior surface of the tire, providing a tool for forming a discontinuity in the interior surface of the tire, forming a discontinuity in the interior surface of the tire, with the tool, along the guide edges of the template, and removing the template from the tire.

12 Claims, 12 Drawing Sheets

(51) Int. Cl.
*B26D 3/06* (2006.01)
*B24B 5/36* (2006.01)
*B29C 73/10* (2006.01)
*B29L 30/00* (2006.01)

(52) U.S. Cl.
CPC .......... *B29C 73/10* (2013.01); *B29C 2073/264* (2013.01); *B29L 2030/00* (2013.01)

(58) Field of Classification Search
USPC ...... 156/97, 98; 81/15.2; 451/267, 281, 282; 144/371, 372, 144.1, 144.51; 152/367, 369
See application file for complete search history.

(56) References Cited

U.S. PATENT DOCUMENTS

| | | | |
|---|---|---|---|
| 1,498,683 A * | 6/1924 | Davis | B29C 73/14 |
| | | | 152/369 |
| 1,569,490 A | 1/1926 | Hiscock | |
| 1,591,813 A | 7/1926 | Frengle | |
| 1,591,816 A | 7/1926 | Hawkinson | |
| 1,753,688 A * | 4/1930 | Boscardin | B29C 73/14 |
| | | | 152/369 |
| 2,000,300 A | 5/1935 | Scruby | |
| 2,523,319 A | 9/1950 | Middlestadt | |
| 2,678,487 A | 5/1954 | Onsrud | |
| 2,937,576 A | 5/1960 | Olton | |
| 2,985,231 A | 5/1961 | Roesch | |
| 3,190,338 A | 6/1965 | Wolfe | |
| 3,421,411 A | 1/1969 | Lowry et al. | |
| 3,521,408 A | 7/1970 | Neugebauer | |
| 3,739,662 A | 6/1973 | Windelman | |
| 3,850,222 A | 11/1974 | Lejuene | |
| 3,860,050 A | 1/1975 | Banks et al. | |
| 3,932,965 A | 1/1976 | Kline, Jr. | |
| 3,979,169 A * | 9/1976 | Whittle | B29C 73/06 |
| | | | 156/97 |
| 4,057,898 A | 11/1977 | Piosky | |
| 4,139,041 A | 2/1979 | Newton | |
| 4,168,730 A | 9/1979 | Keller | |
| 4,230,164 A | 10/1980 | Mericle | |
| 4,319,615 A | 3/1982 | Ditmanson | |
| 4,333,686 A | 6/1982 | Arnswald | |
| 4,382,590 A | 5/1983 | Pandya et al. | |
| 4,435,456 A | 3/1984 | Hausch | |
| 4,479,523 A | 10/1984 | Peterson et al. | |
| 4,620,407 A | 11/1986 | Schmid | |
| 4,644,701 A | 2/1987 | Arrigoni et al. | |
| 4,705,436 A | 11/1987 | Robertson | |
| 4,817,697 A | 4/1989 | Takami et al. | |
| 5,115,870 A | 5/1992 | Byrne | |
| 5,139,840 A | 8/1992 | Ferrara | |
| 5,350,481 A * | 9/1994 | Shepard | B29C 67/247 |
| | | | 152/369 |
| 5,445,691 A | 8/1995 | Nakayama et al. | |
| 5,468,100 A | 11/1995 | Naim | |
| 5,540,210 A | 7/1996 | Jones | |
| 5,697,833 A | 12/1997 | Hislop | |
| 5,788,414 A | 8/1998 | Gordon | |
| 6,062,950 A | 5/2000 | Morgan | |
| 6,129,611 A | 10/2000 | Yamaguchi | |
| 6,321,457 B1 * | 11/2001 | Lariviere, Jr. | B26B 29/06 |
| | | | 33/562 |
| 6,450,864 B1 | 9/2002 | Smith | |
| 6,461,135 B1 | 10/2002 | Lagnier et al. | |
| 6,623,342 B1 | 9/2003 | McDonald | |
| 7,316,835 B1 * | 1/2008 | Swanson | C09J 7/0296 |
| | | | 156/71 |
| 7,596,872 B2 | 10/2009 | Clarke et al. | |
| 8,231,428 B2 | 7/2012 | Poling, Sr. et al. | |
| 8,298,040 B2 | 10/2012 | De Gradi | |
| 8,662,134 B2 | 3/2014 | Lindsay et al. | |
| 2002/0066190 A1 | 6/2002 | Fey et al. | |
| 2002/0095810 A1 | 7/2002 | Carlson et al. | |
| 2003/0010802 A1 | 1/2003 | Blaimschein et al. | |
| 2005/0081972 A1 | 4/2005 | Lopez | |
| 2005/0200087 A1 | 9/2005 | Vasudeva et al. | |
| 2005/0236069 A1 | 10/2005 | O'Brien | |
| 2007/0232195 A1 | 10/2007 | Reppel | |
| 2008/0005947 A1 | 1/2008 | Barna | |
| 2009/0001642 A1 | 1/2009 | Bolton | |
| 2009/0170405 A1 | 7/2009 | Barusta | |
| 2010/0143060 A1 | 6/2010 | Weber et al. | |
| 2010/0258229 A1 * | 10/2010 | Colby | B29C 73/10 |
| | | | 152/367 |
| 2011/0277898 A1 | 11/2011 | Barraud et al. | |

FOREIGN PATENT DOCUMENTS

| | | |
|---|---|---|
| CN | 101148020 A | 3/2008 |
| DE | 3926946 A1 | 1/1991 |
| DE | 4442553 A1 | 11/1994 |
| FR | 1211507 A | 3/1960 |
| JP | 2006346886 A | 12/2006 |
| RU | 10634 U1 | 8/1999 |
| RU | 2176954 C1 | 12/2001 |
| SU | 44448 A1 | 11/1942 |
| SU | 380436 | 11/1972 |
| SU | 1659223 A1 | 6/1991 |
| WO | 2009157941 A1 | 12/2009 |
| WO | 2012057806 A1 | 5/2012 |

OTHER PUBLICATIONS

A Shipwright in Training. (Nov. 17, 2008). Retrieved Dec. 12, 2014, from http://daviddanielsdesigns.com/boatblog/index.php/page/6, 46 pages.
Sculpted Rocking Chair: Shaping the Seat. (Mar. 30, 2009). Retrieved Dec. 12, 2014, from http://thecraftsmanspath.com/2009/03/30/sculpted-rocking-chair-shaping-the-seat, 11 pages.
Harper, S. (Jul. 10, 2009). Poor Folk Bows. Retrieved Dec. 12, 2014, from http://poorfolkbows.com/violin4.htm, 18 pages.
Changing dovetail width with a fixed jig. (Apr. 5, 2010). Retrieved Dec. 22, 2014, from http://tomsworkbench.com/2010104/05/changing-dovetail-width-with-a-fixed-jig, 5 pages.
PCT/US2010/054789 International Search Report and Written Opinion dated Apr. 19, 2011, 14 pages.
Michelin Truck Nail Hole Repair Procedures, Michelin 2007, 6 pages, retrieved from Internet <URL:www.michelintruck.com/assets/pdf/NailHoleRepairManual.pdf>.

* cited by examiner

FLEXIBLE GUIDE FOR TIRE REPAIR

This application is a National Stage application of International Application No. PCT/US2010/054789, filed Oct. 29, 2010, to which this application claims priority and the benefit of, the disclosure of which is also hereby incoporated by reference.

FIELD OF THE INVENTION

This invention relates generally to tire repair, and, more specifically, to a method and apparatus for preparing the damaged portion of a tire to be patched.

BACKGROUND OF THE INVENTION

Tires are known to be susceptible to becoming damaged. Such damage may occur when a tire encounters road debris, such as nails, glass, and stone, and during tire mounting and dismounting. Damage may also form a defect in the tire. Damage may occur on the inside or outside of the tire, or may penetrate the tire, such as a puncture or laceration. Further, the damage may occur along the tread area, the sidewalls, or the shoulders, which is the area between the tread area and a sidewall. A damaged tire portion generally refers to a portion of the tire needing repair, where the need may arise for any reason.

When repairing the damaged area of a tire, a patch is commonly used to cover and seal the damaged area. A patch is generally made of polymeric or elastomeric material, such as natural or synthetic rubber. A patch may further include reinforcements extending within the patch, which may form of metallic cables or cords formed of any textile material for the purpose of partially replacing the function of any damaged tire reinforcement. Further, the patch may be adhesively affixed or cured to the tire. The damaged area may be prepared before application of the patch. For example, debris and any damaged material may be removed, the damaged portion cleaned, and/or an adhesive or cement applied to the damaged area.

SUMMARY OF THE INVENTION

Particular embodiments of the present invention include methods and apparatus for preparing a portion of a tire for repair. Particular embodiments of the present invention include a template for repairing a portion of a tire for repair, the tire having an aperture extending between an interior surface and an exterior surface of the tire, where the template may comprise an elongated body having a length at least equal to the length of a tire patch selected for application to the tire adjacent the aperture, a width extending between a pair of opposed guide edges extending longitudinally along the body, a thickness, and a means for securing the template to the tire. The means for securing may be adapted to secure the template to the tire through the aperture, the means for securing extending from an exterior surface of the elongate body, the exterior surface extending longitudinally and laterally along the elongated body.

Particular embodiments of the present invention additionally include a rotary grinding tool comprising a rotary output shaft for transmitting rotational forces, a pair of abrading members operably attached to the output shaft and aligned axially with the output shaft, and a collar positioned between, and coaxial with, the pair of abrading members, the collar being independently rotatable from the output shaft, the collar having an outside diameter smaller than an outside diameter of each of the pair of abrading members.

Particular embodiments of the present invention also include a method for preparing a portion of a tire for repair, the tire having an aperture extending between an interior surface and an exterior surface of the tire, where the method may comprise the steps of providing a template having an elongated body having a length at least equal to the length of a tire patch selected for application to the tire adjacent the aperture, a width extending between a pair of opposed guide edges extending longitudinally along the body, a thickness, and a means for securing the guide to the tire. The particular embodiments may also comprise the steps of securing the guide to an interior surface of the tire by passing the means for securing through the aperture, providing a tool for forming a discontinuity in the interior surface of the tire, forming, with the tool, a discontinuity having a desired discontinuity depth in the interior surface of the tire along each edge of the template, the pair of discontinuities spaced apart and at least partially defining the sides of a tire patch application area, and removing the template from the tire.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF THE DRAWINGS

Particular embodiments of the present invention provide methods and apparatus for preparing a portion of a tire for repair, which may have been damaged or otherwise needs repair. Specifically, the damaged portion of the tire is prepared to facilitate repair by patching and/or filling the damaged portion using a tire patch and or tire patching material. It is known that it may be desirable to repair or reinforce a particular area of a tire, such as, for example, when the tire is damaged during tire operation. This damaged area may be located anywhere on a tire, such as in the sidewall, the shoulder, or the tread areas. Typically, the area to be patched is prepared before receiving the patch to promote adhesion of the patch. For example, the surface may be cleaned with a solution and/or by a buffing or abrading operation. For particular patches, it is desirous to recess the patch into the tire surface by removing material from the surface sufficient to form a patch receiving area having a desired depth. The depth of the patch receiving area may extend a constant or a variable depth from the original tire surface.

Particular embodiments of such methods may include the step of providing a template having an elongated body having a length at least equal to the length of a tire patch selected for application to the tire adjacent the aperture, a width extending between a pair of opposed guide edges extending longitudinally along the body, a thickness, and a means for the securing template to the tire. It is also contemplated that the length of the elongated body may be substantially equal to the length of a tire patch, or additionally, less than the length of a tire patch. In one embodiment, the body may be resiliently flexible, that is, it may be formed from a material which may be bent to adapt to the contours of a tire yet may resume its unbent form once the template is removed from the tire. The template may be flexible and formed of any flexible material to allow the template to bend and adapt to one or more curvatures of the tire. Examples of flexible materials include polymers, plastics, elastomers (natural and synthetic), and even chain-linked materials. Further, the flexible material may be sufficiently rigid such that it is not appreciably deformable when used in conjunction with a tool for forming a discontinuity. In other words, the material may be sufficiently flexible so as to be bendable, while being sufficiently rigid so as to minimize compression. It is also possible to form the template of a more rigid material that generally resists any bending, whereby the template is molded to one or more contours of the tire to which the template is intended to be applied. While any sufficient material may be used, examples include plastics and metals. Of course, the template may form a composite, such as when constructing the template using layers of different materials, embedding one or more materials within the template, such as by molding a material about an internal material, or when using particular materials to enhance or reinforce the template at particular locations (such as forming the top surface or a portion thereof from a more durable and/or wear-resistant material, while the remainder of the template is more flexible). The template may be molded, machined, or otherwise formed through any known process.

In particular embodiments, the step of providing a template further includes selecting the template, wherein the template length, thickness, and width correspond to a length, a thickness, and a width of a tire patch. In one exemplary embodiment, the opposed edges may be substantially parallel and may have a thickness corresponding to a desired discontinuity depth of a tire. It is also contemplated that the distance between the opposed edges may correspond to the width of a tire patch material. It is still further contemplated that the template may be triangular, square, or any other shape that corresponds to the shape of a tire patch material.

Additionally, the methods may include the steps of securing the template to an interior surface of the tire by passing the means for securing through the aperture. In particular embodiments, the means for securing may extend from an exterior surface extending longitudinally and laterally along the elongated body. It is contemplated that the means for securing may include a threaded fastener extending from an exterior surface of the elongated body, a washer, and a nut configured to threadingly engage the threaded fastener. As such, the fastener may be passed from the interior surface of the tire, through the aperture, and extend beyond the exterior surface. It is contemplated that the washer may then be placed over the fastener and the nut may then be threaded onto the fastener and tightened such that the template is clamped to the tire. Rather than a separate nut and washer, it is also contemplated that the nut and washer may be unitary. The means for securing may also include a shaft with a corresponding adapter capable of sliding along the shaft to clamp the template to the tire. To limit lateral movement of the template during the step of forming a discontinuity, the means for securing may also include a pair of fasteners, shafts, or the like. Alternatively or additionally, the bottom portion of the elongated body may be textured to limit lateral movement of the template. Such texture may be applied by any means known to one of ordinary skill in the art, and may including without limitation, molding the texture into the body, coating the bottom portion with a grit, roughening the bottom portion, or by inserting pins extending beyond the surface of the bottom portion.

Particular embodiments of such methods include the step of providing a tool for forming a discontinuity in the interior surface of the tire. It is contemplated that any tool known to one of ordinary skill in the art for forming a discontinuity may be provided. For example, a cutting or abrading wheel attached to a rotary driver may be used. In a further example, the tool may have the form of a heated blade operably connected to a grooving iron.

In particular embodiments, the tool may be a powered rotary grinding tool. It is contemplated that the rotary grinding tool may include a rotary output shaft for transmitting rotational forces, a pair of abrading members operably attached to the output shaft and aligned axially with the output shaft, each abrading member having a major radius associated with a desired discontinuity depth, and a collar positioned between, and coaxial with, the pair of abrading members, the collar being independently rotatable from the shaft and having a radius associated with the desired discontinuity depth. In particular embodiments, at least one abrading member may be selectively positionable along the shaft. It is further contemplate that the at least one selectively positionable abrading member may be biased toward the other abrading member, a state which may be achieved, for example, by a tension spring located between the abrading members. The collar may be generally freely rotatable, whereby a bearing is interposed between the shaft and the collar to significantly reduce the transmission of rotatable forces from the shaft to the collar. It is also contemplated that the collar radius is smaller than the major radii of the abrading members, further wherein the abrading member major radius minus the sum of the thickness of the template and the radius of the collar corresponds to the desired discontinuity depth. As indicated, both the abrading members and the collar may have a radius associated with and/or corresponding to a desired discontinuity depth. The association and/or correspondence between the indicated radii and the discontinuity depth is such that each of the radii, together or independently, as well as the thickness of the template, may be adjusted to produce the desired depth. The rotary grinding tool is discussed more fully below.

In particular embodiments, the forming step may also include engaging the collar with each of the opposing side edges of the template and abrading, with the rotary grinding tool, the desired discontinuity depth of tire material from the interior surface of the tire along each edge of the template to form a pair of spaced apart discontinuities to at least partially define the sides of a tire patch application area. Further, the methods may include the step of forming, with the tool, a discontinuity having a desired discontinuity depth in the interior surface of the tire along each edge of the template, the pair of discontinuities spaced apart and at least partially defining the sides of a tire patch application area. After forming the pair of spaced apart discontinuities, it is also contemplated that a lateral discontinuity may be formed between the pair of spaced apart discontinuities at each end of the discontinuities. As is generally known, it may be desirous for a tire to include reinforcements or reinforcing layers to add strength and durability to tires. In certain tires, the interior layer may be referred to as the innerbelt, the next layer may be an additional rubber layer, followed by a reinforcement layer, which itself may include a reinforcement laminated between a series of skim layers. In certain instances, it may be desirous to remove only the innerbelt, while in other cases it may be desirous to remove both the innerbelt and the rubber layer. In either case, attention should be paid to avoid compromising this reinforcing layer by forming a discontinuity therein, as such damage may result in additional need to remove and/or repair the damaged reinforcement layer. In particular embodiments, then, the desired discontinuity depth may be less than the distance from the interior surface of the tire to a tire reinforcement or tire reinforcement layer.

In particular embodiments, the methods may include the step of removing the template from the tire, which may include disengaging the means for securing the template from the tire. In particular embodiments, the methods may also include the step of removing the tire material between the pair of spaced apart discontinuities to the desired discontinuity depth. It is envisioned that this material may be removed by any technique known to one of ordinary skill in the art. For example, the material may be peeled away manually with a force sufficient to overcome the bond between the material to be removed and the portion of the tire to remain intact. In a further example, the tool used for forming the discontinuity in the tire may be employed for removing tire material to the desired discontinuity depth between the pair of spaced apart discontinuities.

In particular embodiments, such methods may also include the step of applying one or more tire patch materials to the portion of the tire associated with the removed tire material. The patch may be used to cover the tire patch application area, whereby the injury or damaged area of the tire is covered. The patch may be made from various types of materials, such as rubber and polymeric materials, for example.

The methods generally described above, and the manner in which they are employed or practiced, are now discussed in further detail below with reference to various exemplary embodiments.

Figure 1:
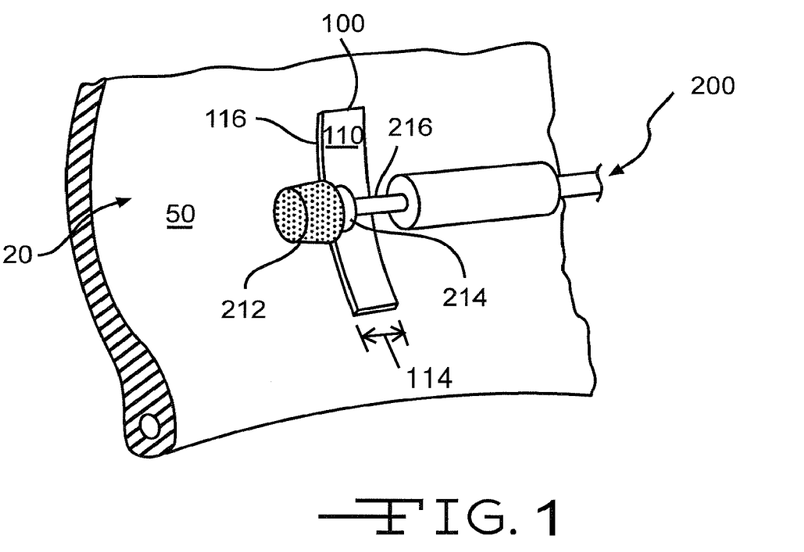
FIG. 1 is a perspective view of a template and rotary grinding tool engaged with the interior surface of a damaged portion of a tire.
Figure 2:
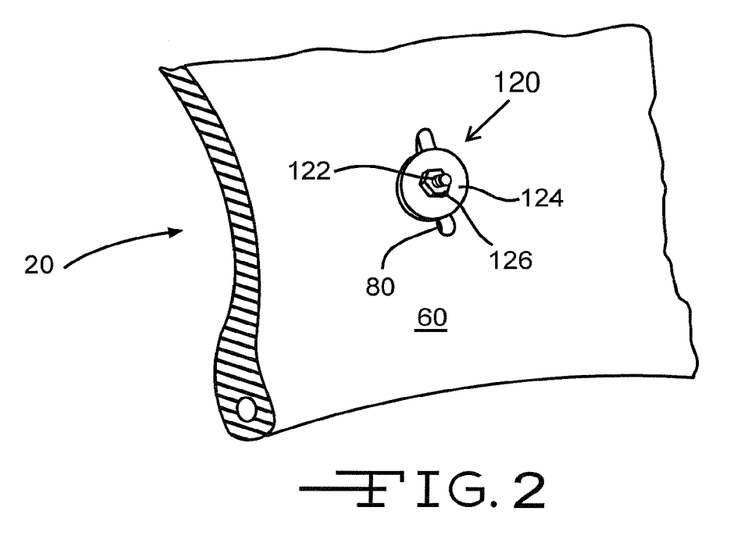
FIG. 2 is a perspective view of the template engaged with the exterior surface of a damage portion of the tire shown in FIG. 1.
Figure 3:
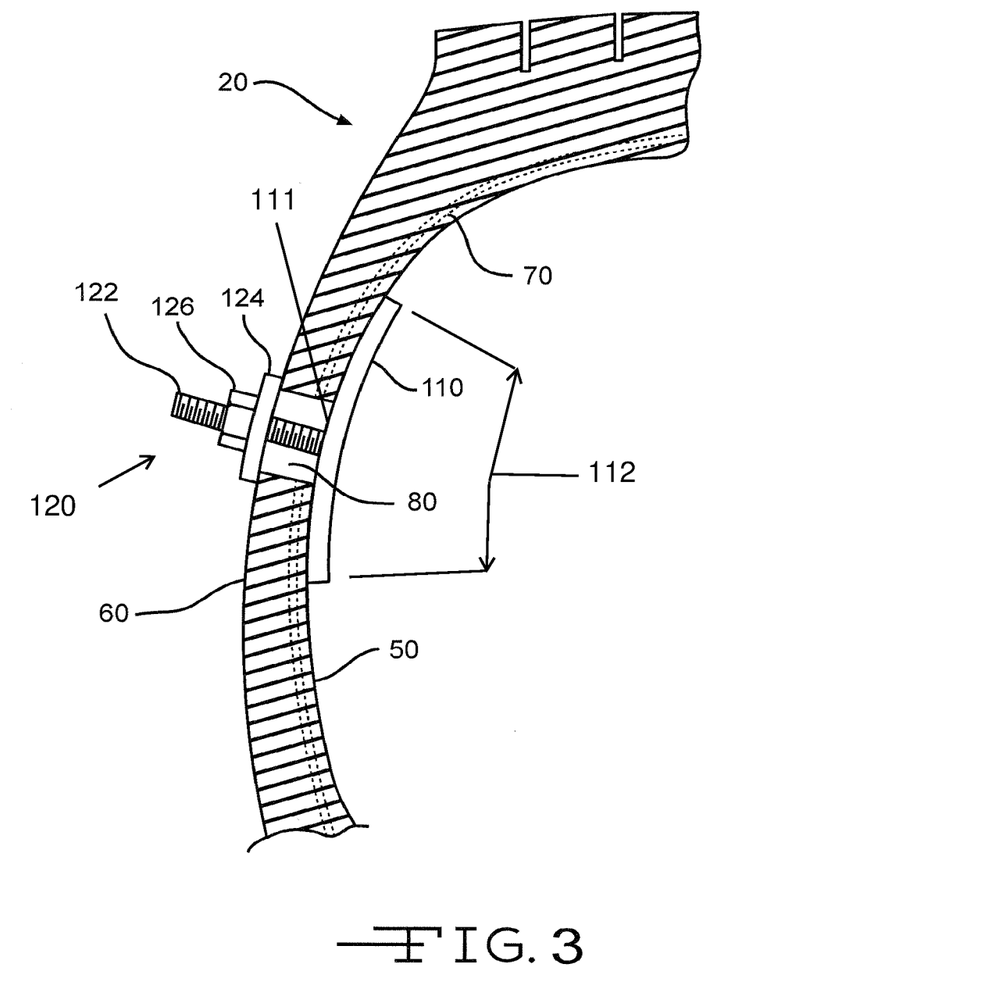
FIG. 3 is a partial cross-sectional view of the template secured to the damaged portion of the tire shown in FIG. 1.

With general reference to the embodiment shown in FIGS. 1-3, a tire 20 may include an aperture 80, which may have been formed through damage or injury to the tire. Generally, the aperture 80 may extend between an interior surface 50 of the tire and an exterior surface 60 of the tire. The aperture 80, shown schematically in FIGS. 2-3, may comprise, for example, a crack, puncture, laceration, abrasion, cavity, or other defect that compromises tire 20. The aperture 80 may comprise any size and shape resulting from damage or injury to the tire.

To aid in patching or other repair to the tire 20, a template 100 may be provided. As shown in a particular embodiment in FIGS. 1-3, the template 100 may comprise an elongated body 110. The elongated body 110 may have a body length 112 and a body width 114 extending between a pair of opposed guide edges 116. The dimensions of the elongated body 110 may be selected to correspond to the dimensions of a tire patch for repairing the damaged area of the tire. By correspond to, it is meant that the dimensions of the elongated body 110 may be similar in width and length to the dimensions of the tire patch while taking into consideration the dimensions of the tools which will be employed in conjunction with the template 100. For example, the body width 114 plus the width of each discontinuity formed along the guide edges 116 may be approximately equal to the width of the selected tire patch. As would be understood by one of ordinary skill in the art, it may be desirous for the dimensions of the body width 114 plus the width of each discontinuity formed along the guide edges 116 to be slightly greater than the width of the selected tire patch to provide for room for adjustment of the patch and to ensure appropriate fit between the tire and the patch. In a particular embodiment, the body length 112 may be at least equal to the length of a tire patch selected for application to the tire 20 adjacent the aperture 80.

Figure 4:
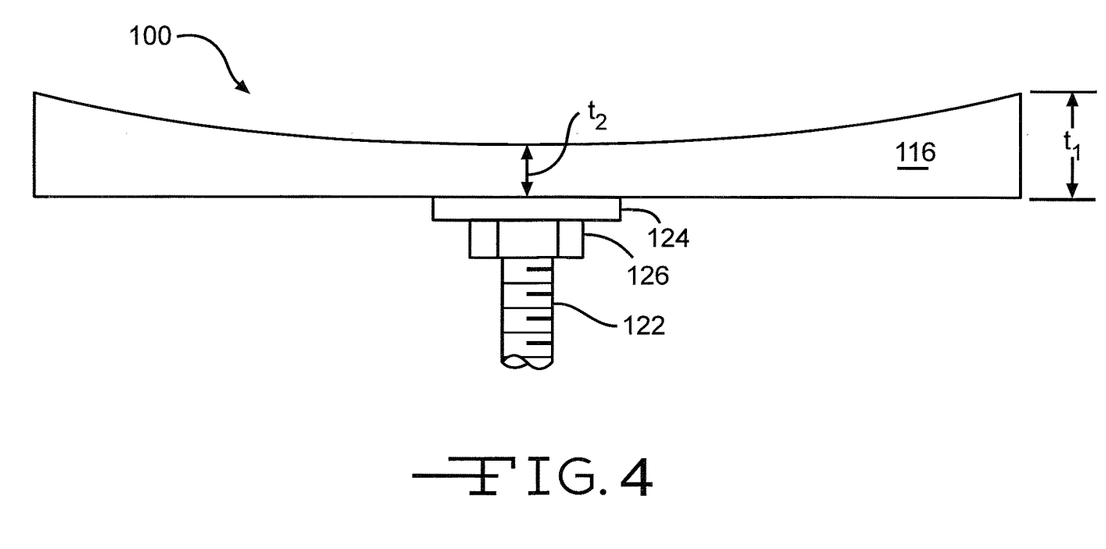
FIG. 4 is a longitudinal side view of the embodiment shown in FIG. 1.

In one exemplary embodiment, shown in FIG. 4, the body thickness 118 may be variable along the length of the template 100. At the longitudinal center of the template 100, the thickness $t_2$ is less than the thickness $t_1$ at each longitudinal end of the body 110. That is, the template 100 may have a minimum thickness at the longitudinal center of the body and a maximum thickness at each longitudinal end of the body. In one embodiment, the body may have a concave profile along its length, although it is contemplated that other variable thickness templates may be employed, depending on the desired discontinuity depth and tire patch dimensions. It is also contemplated that the body thickness 118 may be a uniform thickness, may taper linearly from longitudinal ends to the longitudinal center, or may have an arcuate profile.

Referring again to FIGS. 1-3, the template 100 may comprise a means for securing 120 the template to the tire. In the embodiments shown, the means for securing 120 may be adapted to secure the template 100 to the tire 20 through the aperture 80. It is contemplated that the means for securing 120 may extend from an exterior surface 111 of the elongated body 110. With particular attention to FIG. 3, the means for securing may include a shaft 122, a washer 124, and a nut 126. It is contemplated that the shaft 122 may be threaded and that the nut 126 may be configured to threadingly engage the shaft. In such a configuration, the shaft 122 may be passed through the aperture 80 from interior surface 50 and extend beyond exterior surface 60 such that the washer 124 may be placed over the shaft and the nut may be threaded down the shaft to clamp the elongated body 110 to the tire 20. As the template 100 serves as a guide for forming discontinuities in the interior surface 50, it may be desirous to minimize lateral movement of the template 100 once it is secured to the tire. Therefore, the means for securing 120 may also include a second shaft 122, washer, 124, and nut 126 spaced apart from the first yet still passing through the aperture 80 for additionally securing the template 100 to the tire 20. Alternatively or additionally, the surface of the template 100 which is placed against the interior surface 50 may be textured to further minimize lateral movement of the template during formation of discontinuities.

Referring now to FIGS. 5-10, in particular embodiments a rotary grinding tool 200 may comprise a rotary output shaft 210 for transmitting rotational forces. Additionally, the tool may comprise an abrading member 212 operably attached to the output shaft 210 and aligned axially with the output shaft. In particular embodiments, the abrading member may be a pair of abrading members 212. Additionally, the tool 200 may comprise a collar 214 positioned between, and coaxial with, the pair of abrading members 212, with the collar being independently rotatable from the output shaft 210. Still further, the collar 214 may have an outside diameter small than an outside diameter of each of the pair of abrading members 212.

Figure 5:
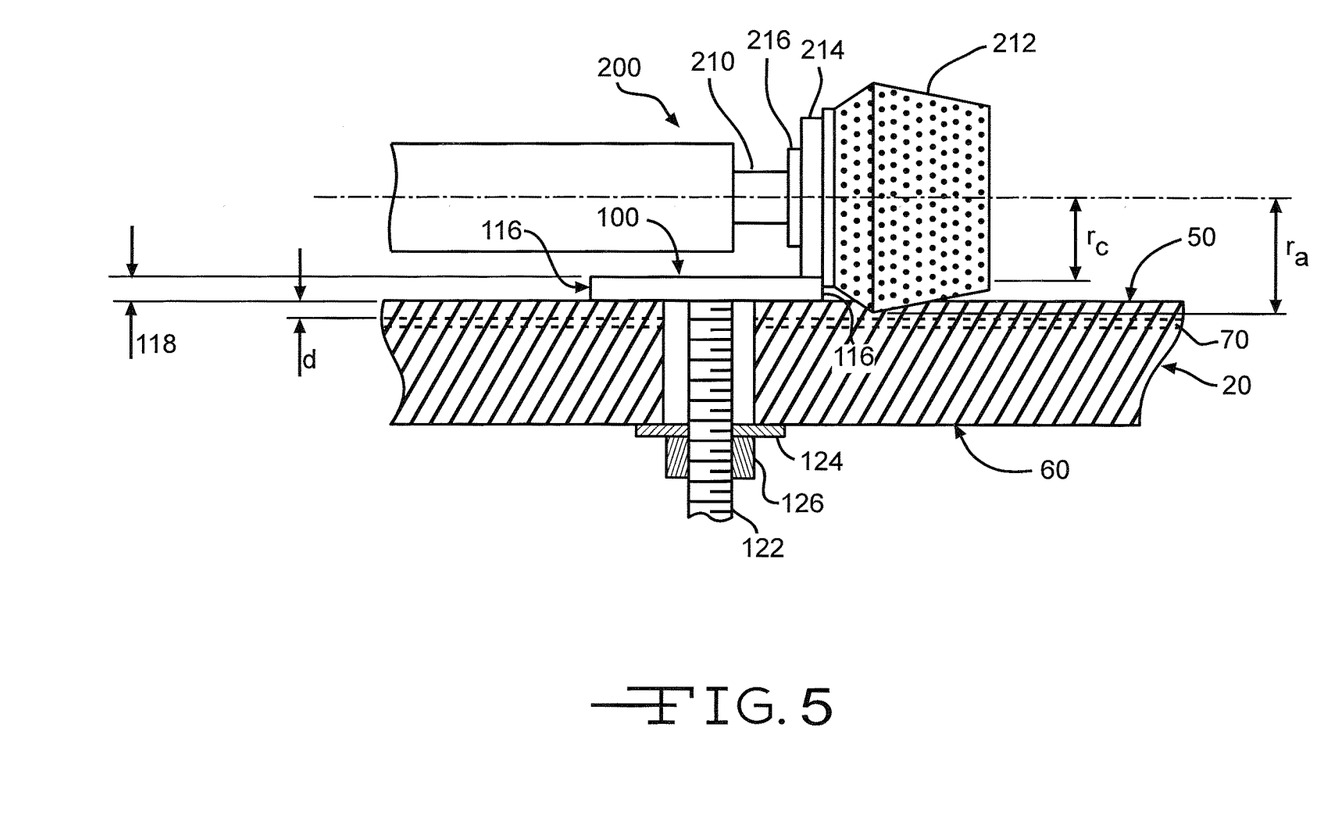
FIG. 5 is a side view showing one embodiment of a rotary grinding tool and a template engaging the interior surface of a damaged portion of a tire.

In an exemplary embodiment shown in FIG. 5, a rotary grinding tool 200 may comprise an output shaft 210, an abrading member 212, a collar 214, and a means 216 for retaining the collar at a fixed position along the shaft. In particular embodiments, the shaft 210 may have a shank adapted to fit within a chuck of a rotary driver at one end. The shank may then be inserted into a variety of rotary tools, for example hand drills, powered screwdrivers, and hand grinders. It is also contemplated that the shaft may be fixtured such that a rotary source perpendicular to the shaft 210 may be used to drive the tool 200, although the rotary source may be provided at any angle deemed suitable by one of ordinary skill in the art. In particular embodiments, the means 216 for retaining may be, for example, a snap ring, a bushing, or any other device configured to be operably attached to a shaft at a fixed position. As shown in FIG. 5, the collar 214 may have two diameters and accordingly may be referred to as a stepped collar. In operation, the collar 214 may engage the template 100, with the smaller of the diameters of the collar registering with the top of the template and the face of the larger of the diameters registering with the guide edge 116. In such a configuration, an operator may be able to move the tool 200 along the length of the template 100, thereby ensuring a discontinuity is formed in the interior surface 50 of the tire at the desired discontinuity depth and at the desired location with regard to the aperture 80.

With continued reference to FIG. 5, it follows then that the collar radius $r_c$ may be less than the abrading member radius $r_a$. Given a known tire reinforcement layer depth, d, the desired discontinuity depth can be ascertained. Generally, the discontinuity depth will be less than the reinforcement layer depth d so as to avoid damaging the reinforcement layer 70. The discontinuity depth may be controlled by varying the body thickness 118, the collar radius $r_c$, and the abrading member radius $r_a$. In the case of a constant body thickness, the discontinuity depth can be calculated by finding the difference between the abrading member radius $r_a$ and the sum of the body thickness 118 and the collar radius $r_c$. Similarly, for a variable thickness template such as that shown in FIG. 4, the instant discontinuity depth may be determined at any point along the length of the template by calculating the difference between the abrading member radius $r_a$ and the sum of the body thickness 118 at a fixed location along the length and the collar radius $r_c$.

Figure 6:
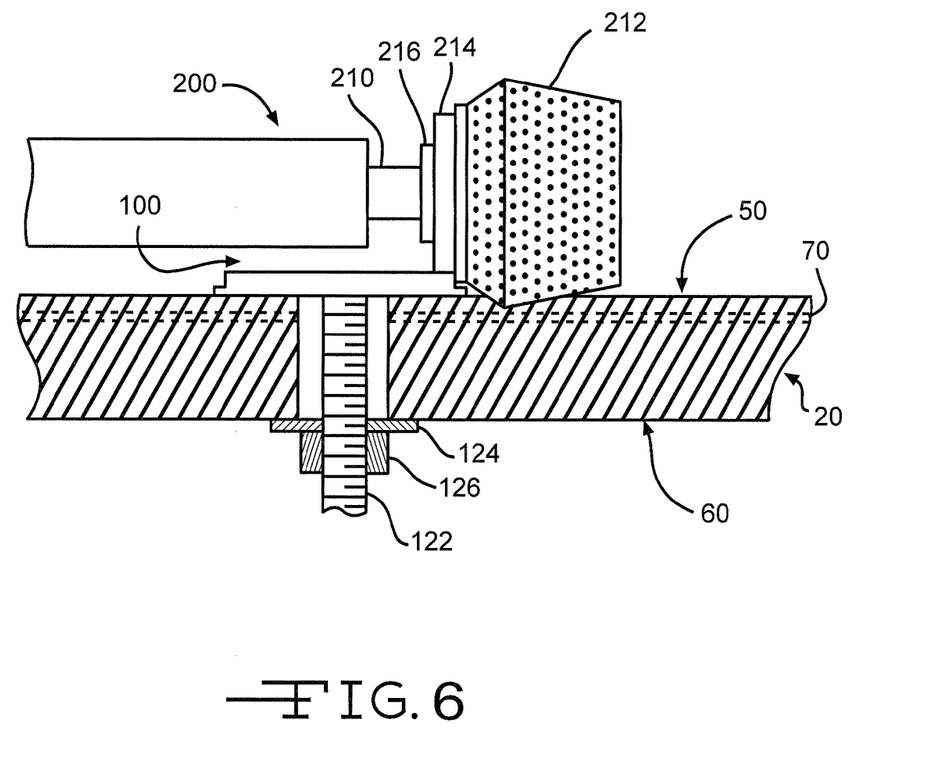
FIG. 6 is a side view showing another embodiment of a rotary grinding tool and a template engaging the interior surface of a damaged portion of a tire.
Figure 7:
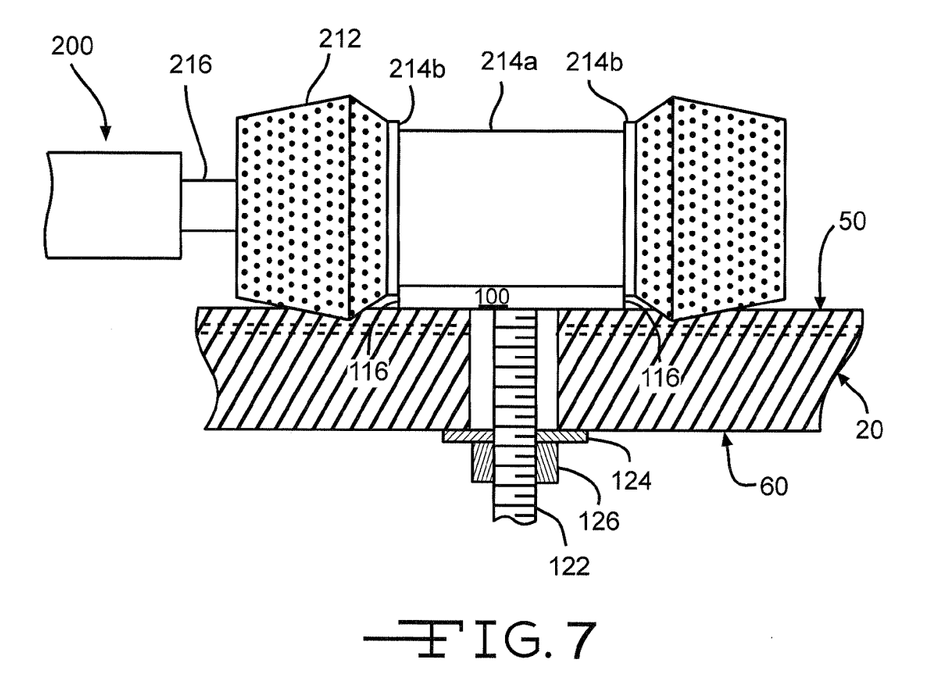
FIG. 7 is a side view showing another embodiment of a rotary grinding tool and a template engaging the interior surface of a damaged portion of a tire.

Other exemplary embodiments are shown in FIGS. 6-9, and in particular, various embodiments of templates 100 and collars 214 are contemplated. As shown in FIG. 6, a combination of a stepped collar 214 and a stepped template 100 may be employed. In an embodiment shown in FIG. 7, the collar 214 may have a central portion 214a with an outside diameter and two opposing end portions 214b arranged at opposing lengthwise ends of the collar, each end portion having an outside diameter that is different than the outside diameter of the central portion. For example, the outside diameter of the central portion 214a may be smaller than the outside diameters of the opposing end portions 214b, such that the outside diameter of the central portion is indexed against the top portion of the template 100 while the face of the each of the outer diameters is indexed against a guide edge 116 of the template 100. In this embodiment, the lateral motion of the tool 200 may be minimized as the length of the central portion 214a may be configured to be substantially equal to the width of the template 100, therein reducing side-to-side movement of the tool once each of the opposing end portions 214b engage the template. Alternatively or additionally, the collar 214 may have a length corresponding to the distance between the abrading members 212 and may extend substantially between the abrading members.

Figure 8:
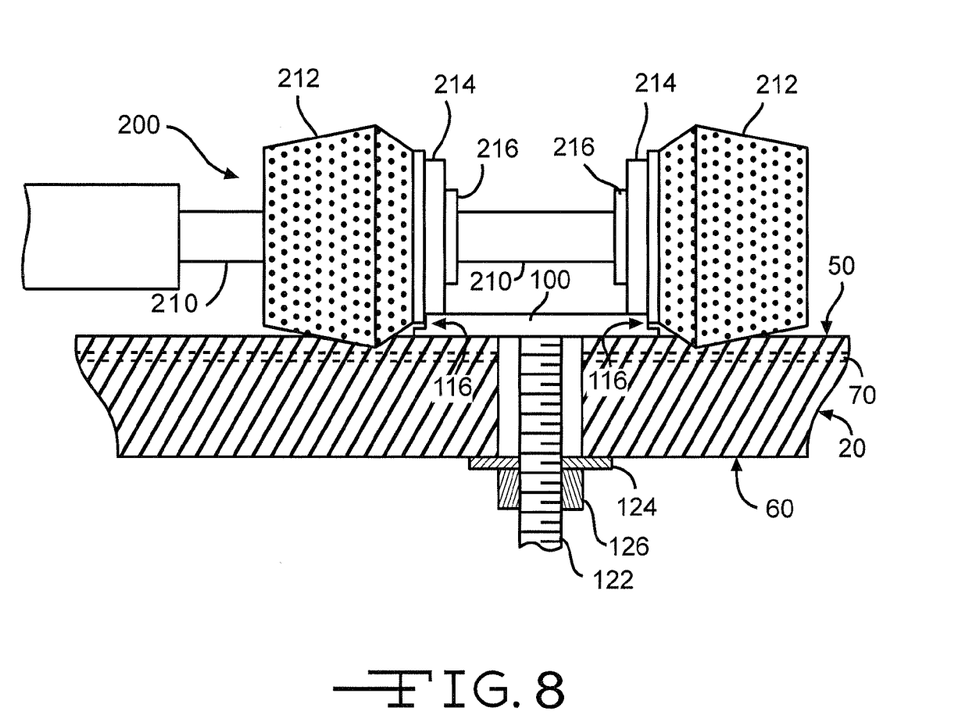
FIG. 8 is a side view showing yet another embodiment of a rotary grinding tool and a template engaging the interior surface of a damaged portion of a tire.
Figure 9:
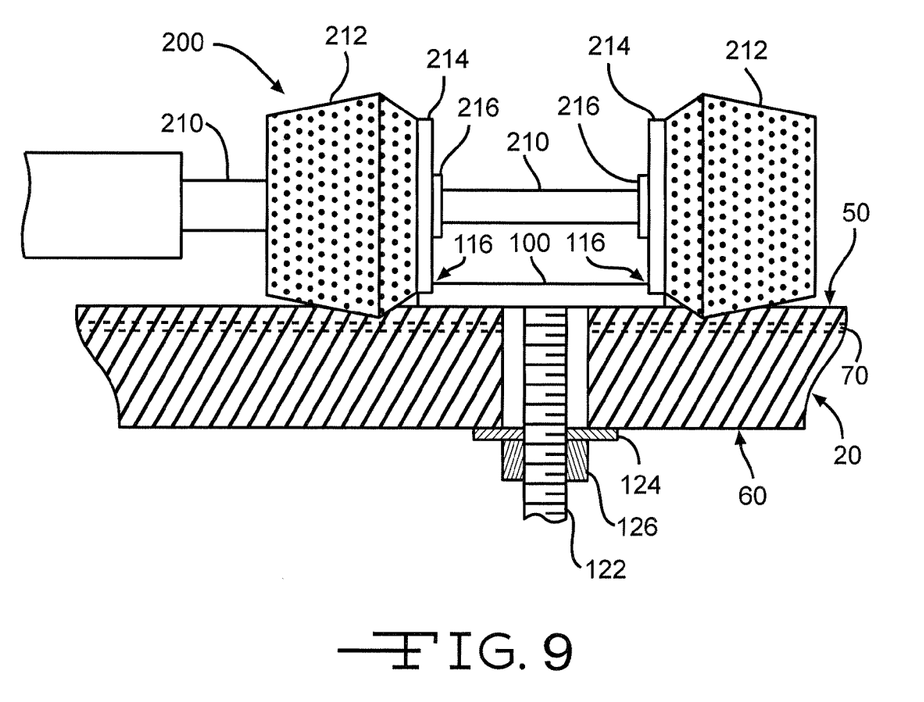
FIG. 9 is a side view showing still another embodiment of a rotary grinding tool and a template engaging the interior surface of a damaged portion of a tire.

In other exemplary embodiments, as shown in FIGS. 8-9, the collar 214 may be two spaced apart collars having a predetermined distance therebetween. It is contemplated that this distance may correspond to the body width 114 of the template 100. In particular embodiments, at least one abrading member 212 may be selectively positionable along the length of the shaft 210 to accommodate varying widths of the template 100. Accordingly, the abrading members 212 may be keyed to the shaft 210 and selectively fixed to the shaft by loosening and subsequently tightening an Allen screw or other set screw once the one or more abrading members 212 are positioned with the desired spacing. It is also contemplated that the shaft 210 may be splined and an interior diameter of the abrading member 212 may be machined to be received on the splined shaft. As shown in the exemplary embodiment of FIG. 8, a stepped collar 214 may be selected in combination with a stepped template 100, similar to the configuration of the embodiment depicted in FIG. 6. With respect to the exemplary embodiment shown in FIG. 9, a stepped template 100 may be employed in combination with a pair of spaced apart collars 214 having a single diameter.

Figure 10:
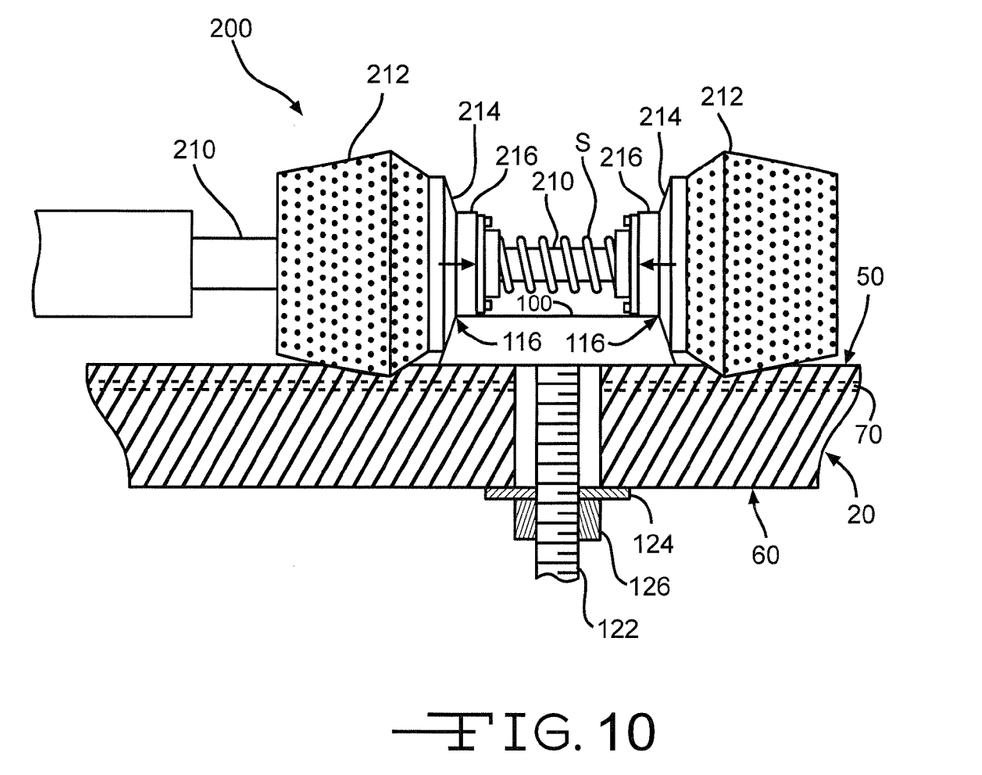
FIG. 10 is a side view showing still yet another embodiment of a rotary grinding tool and a template engaging the interior surface of a damaged portion of a tire.

As shown in an exemplary embodiment in FIG. 10, abrading members 212 and collars 214 may be inwardly biased and slideable along the shaft 210, such that the collars and the abrading members may be moved inwardly and outwardly to follow along the profile of the template 100 during the formation of discontinuities along the guide edges 116. Additionally or alternatively, the collar 214 may include a portion angled to correspond to an angled guide edge 116, which may be perpendicular to the interior surface 50 or provided at an any angle other than perpendicular to the interior surface 50. Regardless of the angle of the guide edges 116, it is envisioned that the collar 214 may be configured to have an angle complimentary to that of the angle of the guide edges, that is, the sum of the angles may be ninety degrees. With regard to biasing one or more abrading members 212 and collars 214 , a biasing member S may be a compression spring coaxial with and located between the abrading members 212 and collars 214, such that the abrading members and collars are pulled together by the spring. It is also contemplated that one abrading member 212 and collar 214 may be fixed on the shaft 210, while a second abrading member 212 and collar 214 may be inwardly biased and slideable along the shaft 210 by a biasing member, for example a compression spring, located between the abrading members. It is still further contemplated one or more biasing members may be located along the shaft at a position not between the abrading members, but rather at a position outside one or more of the abrading members, such that the biasing member or members push the abrading members inwardly to follow the profile of a provided template.

Figure 11:
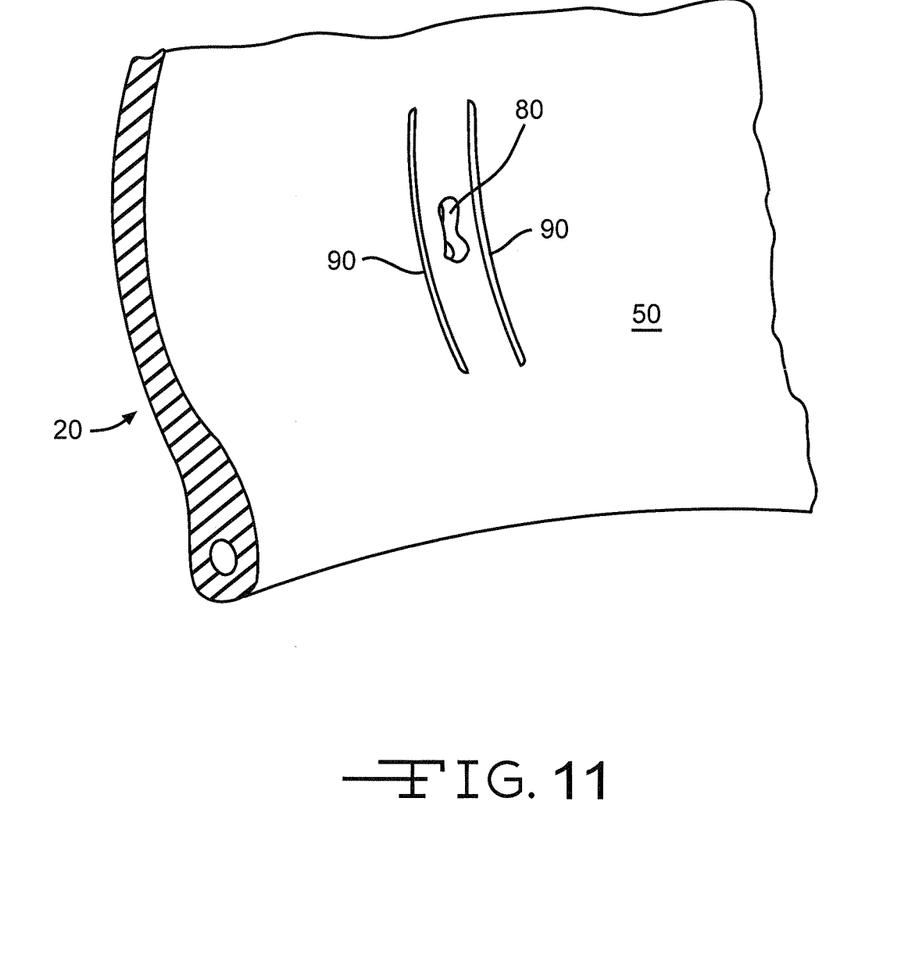
FIG. 11 is a perspective view of the interior surface of a damaged tire having a pair of discontinuities formed therein according to one disclosed embodiment.
Figure 12:
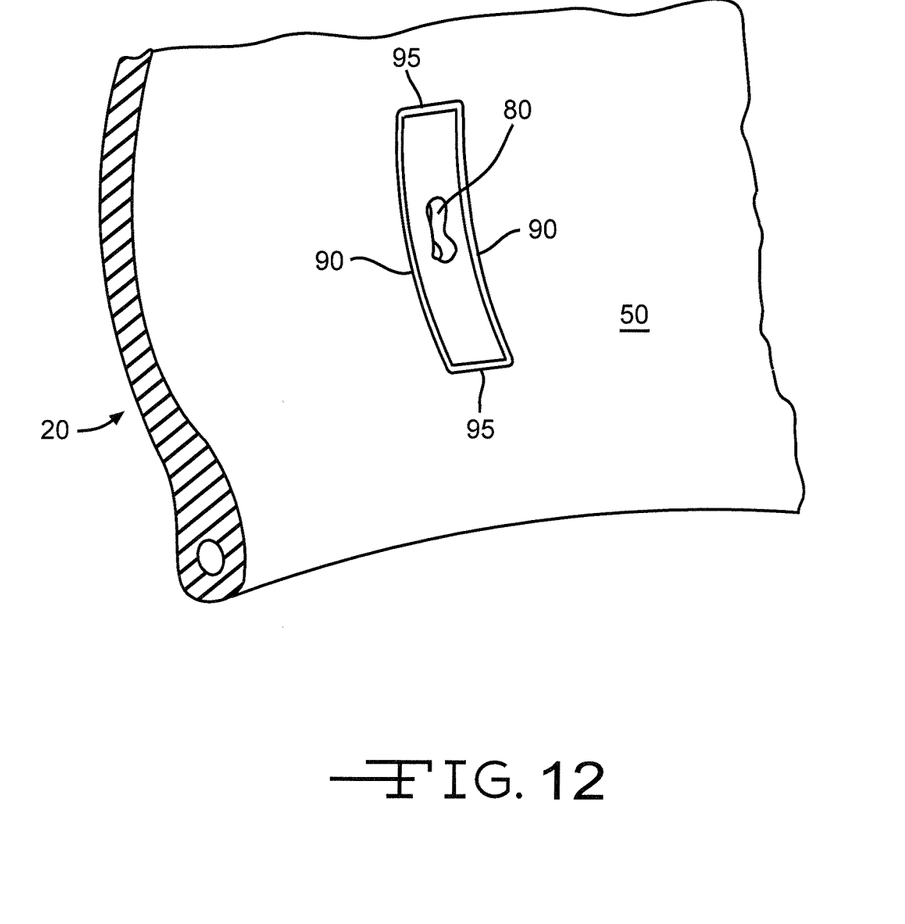
FIG. 12 is a perspective view of the interior surface of a damaged tire having two pair of discontinuities formed therein according to one disclosed embodiment.
Figure 13:
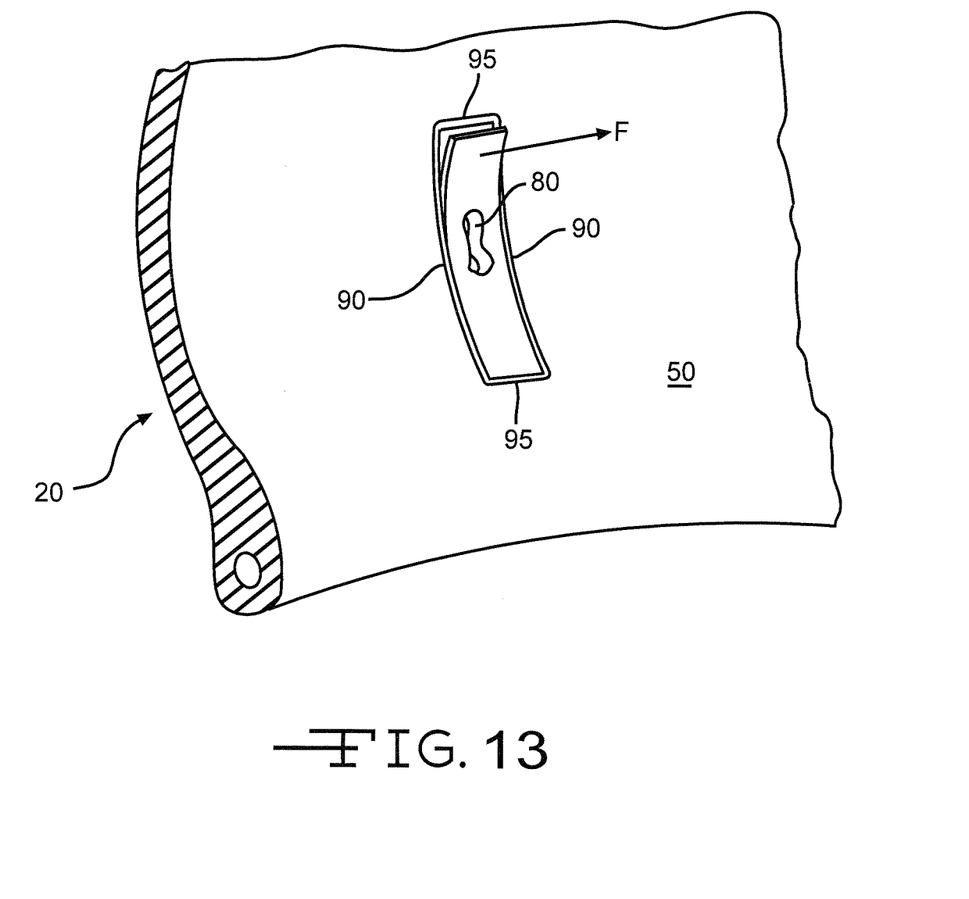
FIG. 13 is a perspective view of the interior surface of a damaged tire showing the removal of tire material between the pair of spaced apart grooves in accordance with one disclosed embodiment.

In particular embodiments, once the template 100 has been removed from the tire 20, the pair of spaced apart discontinuities 90 may be present in the interior surface 50 of the tire, as shown in FIG. 11. As shown in FIG. 12, an operator may choose to form additional discontinuities 95 laterally between the pair of spaced apart discontinuities 90 using a tool for forming discontinuities as described above. This pair of discontinuities 90, 95 may then at least partially define the perimeter of a tire patch application area. In particular embodiments, the tire material located within the perimeter of the tire patch application area may be removed to the desired discontinuity depth. It is envisioned that this material may be removed by any technique known to one of ordinary skill in the art. For example, and as shown in FIG. 13, the material may be peeled away manually with a force F sufficient to overcome the bond between the material to be removed and the portion of the tire to remain intact. In a further example, the tool used for forming the discontinuity in the tire may be employed for removing tire material to the desired discontinuity depth between the pair of spaced apart discontinuities, for instance by grinding or abrading.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method for preparing a portion of a tire for repair, the tire having an aperture extending between an interior surface and an exterior surface of the tire, the method comprising the steps of:
   (a) providing a template having an elongated body, the body having a length at least equal to the length of a tire patch selected for application to the tire adjacent the aperture, a width extending between a pair of opposed guide side edges extending longitudinally along the body, a thickness, and a means for securing the template to the tire;
   (b) securing the template to an interior surface of the tire by passing the means for securing through the aperture;
   (c) providing a tool for forming a discontinuity in the interior surface of the tire, wherein the tool is a powered rotary grinding tool and includes a rotary output shaft for transmitting rotational forces and a pair of abrading members operably attached to the output shaft and co-axially aligned;
   (d) forming with the tool, a discontinuity having a desired discontinuity depth in the interior surface of the tire along each of the opposed guide side edges of the template while the tool is in engagement with the corresponding opposed guide side edge to form a pair of discontinuities spaced apart and at least partially defining the sides of a tire patch application area; and
   (e) removing the template from the tire.

2. The method of claim 1, wherein the tool further includes:
   a collar positioned between, and coaxial with, the pair of abrading members, the collar being independently rotatable from the shaft, the collar having an outside diameter smaller than an outside diameter of each of the pair of abrading members.

3. The method of claim 2, wherein the forming step further includes:
   engaging the collar with each of the opposed guide side edges of the template; and
   abrading, with the rotary grinding tool, the desired discontinuity depth of tire material from the interior surface of the tire along each edge of the template to form the pair of spaced apart discontinuities.

4. The method of claim 2, wherein the collar forms one of a pair of spaced apart collars arranged coaxially with the pair of abrading members.

5. The method of claim 2, wherein the collar has a length substantially comprising a distance separating the pair of abrading members.

6. The method of claim 2, the collar having a central portion with an outside diameter and two opposing end portions arranged at opposing lengthwise ends of the collar, each end portion having an outside diameter that is different than the outside diameter of the central portion.

7. The method of claim 1, wherein the step of providing a template further includes selecting the template, wherein the template length, thickness, and width correspond to a length, a thickness, and a width of a tire patch selected for repairing the tire.

8. The method of claim 1, further comprising the steps of:
   (f) removing the tire material between the pair of spaced apart grooves to the desired discontinuity depth; and,
   (g) applying a tire patch to the portion of the tire associated with the removed tire material.

9. The method of claim 1, wherein the desired discontinuity depth is less than the distance from the interior surface of the tire to a tire reinforcement.

10. The method of claim 1, wherein at least one abrading member of the pair of abrading members is selectively positionable along the length of the shaft.

11. The method of claim 10, wherein the at least one selectively positionable abrading member is biased toward the other abrading member.

12. The method of claim 1, where the means for securing includes a shaft and a clamping mechanism for arrangement along the shaft.

* * * * *